J. E. Coffin. Sheet 1. 3 Sheets.

Folding & Cording Edges of Paper Goods

No. 3547. Reissued Jul. 13. 1869.

Witnesses
Wm Franklin Geary
Henry C. Houston

Inventor
John E. Coffin
Per W. H. Clifford Atty. for Assignees.

J. E. Coffin. Sheet 2. 3 Sheets.

Folding & Cording Edges of Paper Goods.

No. 3547. Reissued Jul. 13. 1869.

Witnesses

Mm Franklin Geary

Henry C. Houston

Inventor

John E Coffin

Per. W. H. Clifford atty for assignees

J. E. Coffin. Sheet 3. 3 Sheets.

Folding & Cording Edges of Paper Goods.

No. 3547. Reissued Jul. 13. 1869.

Witnesses

M. Franklin Savory

Henry C. Houston

Inventor

John E. Coffin

Per U. A. Cliffe atty for assignees.

United States Patent Office.

A. T. DENISON AND E. P. FURLONG, OF MECHANIC'S FALLS, MAINE.
ASSIGNEES OF JOHN E. COFFIN.

*Letters Patent No.* 84,091, *dated November* 17, 1868; *reissue No.* 3,547, *dated July* 13, 1869.

IMPROVEMENT IN MACHINES FOR FOLDING AND CORDING THE EDGE OF PAPER STRIPS.

The Schedule referred to in these Letters Patent and making part of the same.

*To all whom it may concern:*

Be it known that JOHN E. COFFIN, of Portland, in the county of Cumberland, and State of Maine, invented a new and useful Machine for Folding and Cording the Edge of Paper Goods; and that the following is a full, clear, and exact description thereof, reference being had to the accompanying drawings, and to the letters of reference marked thereon, and making a part of this specification, in which—

Figure 1, plate 1, shows a side elevation of the invention.

Figure 2, plate 1, is a top plan of the same, with the guide-rack removed.

Figure 2:
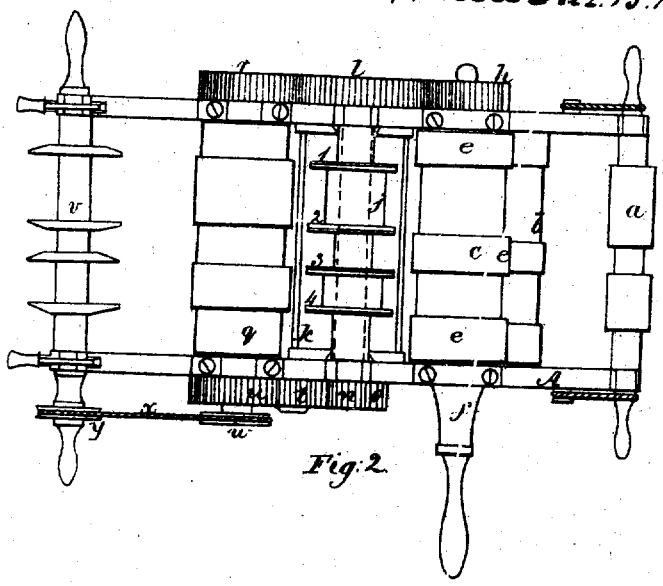
Figure 1:
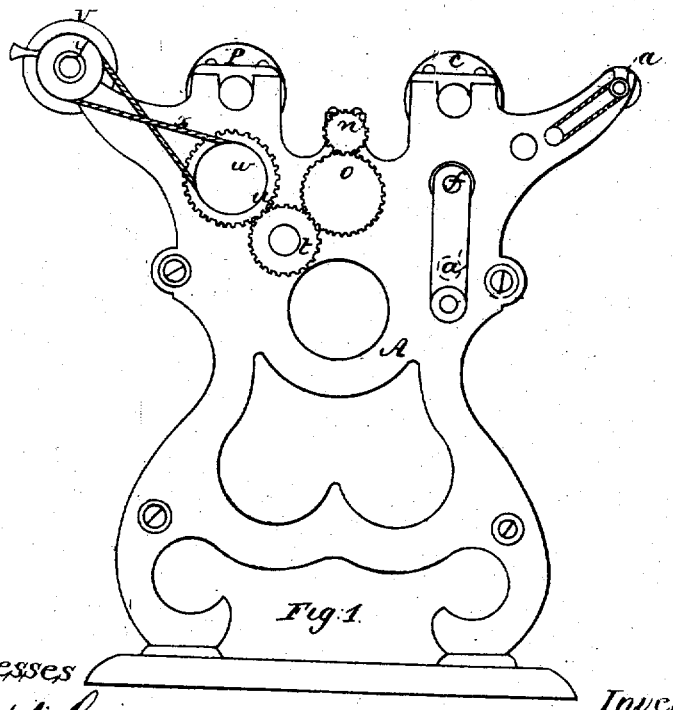
Figures 4, 5, 6:
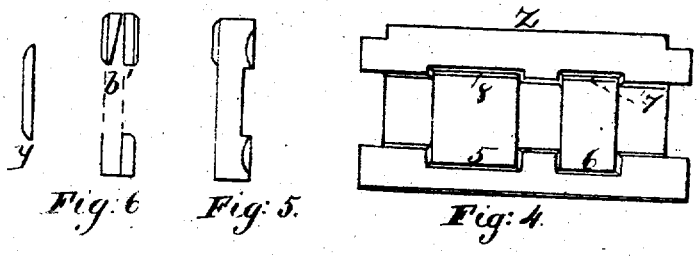
Figure 4 is a plan of the guide-rack.

Figure 5, an end view of the rack.

Figure 6, a transverse section of the rack, showing the throats, with a detail of one of the throats, showing the slope thereof.

Figure 7:
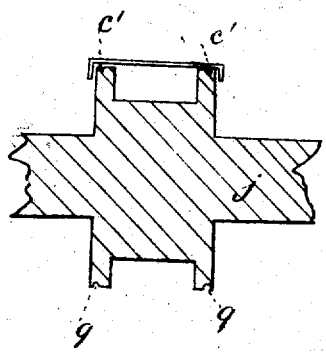

Figure 7 shows a longitudinal vertical section of a portion of the paste-roll, with the cord and paper passing through the same, (enlarged section.)

Figure 8:
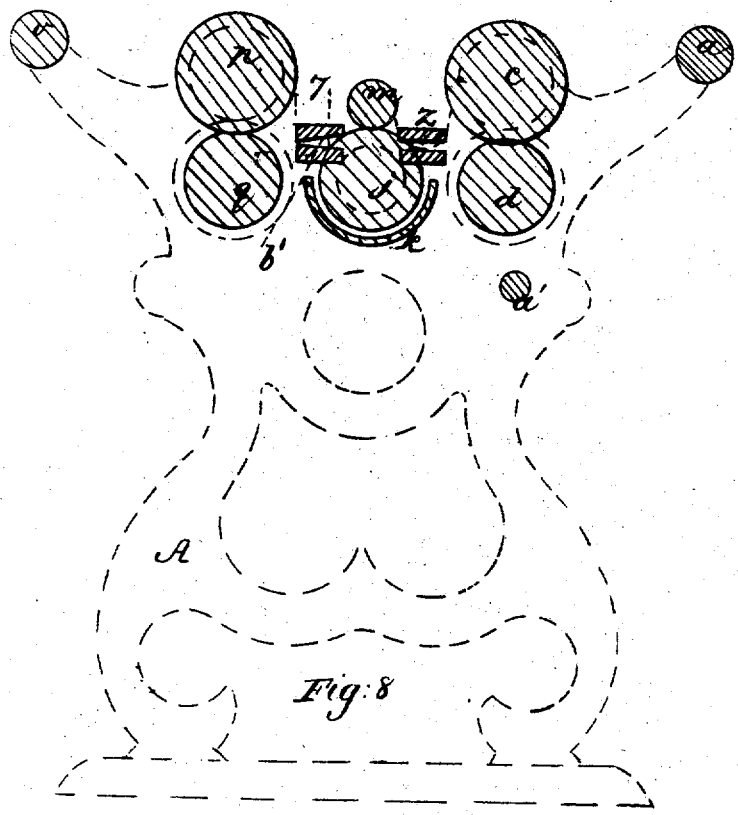

Figure 8 shows a vertical longitudinal section of the invention.

Same letters show like parts.

The purpose of this invention is to provide an automatic machine for folding and cording the edge of paper goods.

The goods to which this machine is applicable are manufactured with an edge of the same folded down upon itself, being provided with some adhesive substance to retain it, and having a cord or thread enclosed within the fold.

The purpose of this machine is to fold the edge, apply the mucilage or adhesive substance, and run and envelop the cord within the fold.

The invention consists, first, in a combination for unwinding the paper, properly directing its passage, and turning the edge thereof at right angles, or nearly so, to the residue thereof.

It further consists in a device for placing an adhesive substance thereon.

It further consists in devices for unwinding the cord from its spool, &c., directing its passage, and placing it in the fold of the paper previously made.

It further consists in devices for pressing or folding the turned edge of the paper down upon the face of the sheet or other portion, enveloping the cord therein; or, in other words, for completing the fold, and causing the folded part to lap the paper beneath the same.

Reference to the accompanying drawings will aid in the specification of this invention.

*A* shows the frame of the machine, of convenient form, size, and material.

*a* is a roller, to hold the paper to be corded, which paper is placed, in rolls or coils, upon the roller, and unwound as the process is accomplished.

*b* is a guide-bar, over or under which the paper enters the machine.

*c d* show two larger rolls, the upper, *c*, having annular projections, *e*, and the under, *d*, corresponding annular indentations or grooves, into which fit and work the projections *e*.

Figure 3:
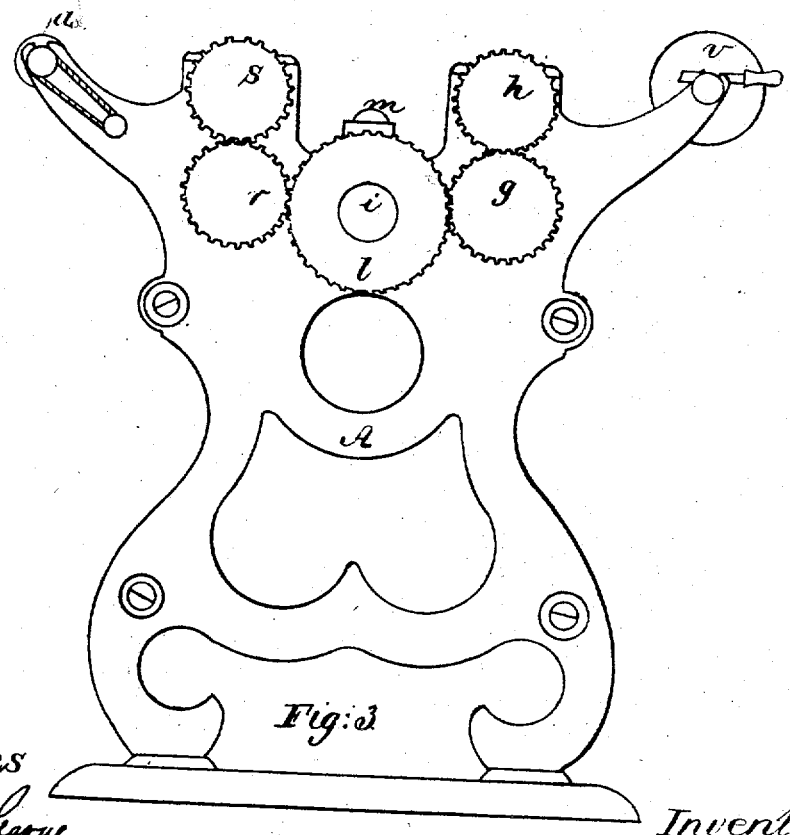
Figure 3 is an elevation of the opposite side from fig. 1.

*d* is set upon a shaft, *f*, and communicates its motion to *c* by the gears *g h*, fig. 3.

Set upon the shaft *i*, is the paste-roll *j*, revolving so that the trucks 1, 2, 3, 4 shall take up a sufficient quantity of the adhesive substance from the trough *k*.

This paste-roll is revolved by the gear *l* matching the gear *g*. (See fig. 3.)

Over the paste-roll is placed the presser-roll *m*, revolved by the gear *n* matching the gear *o*, on the end of the shaft of the paste-roll *j*.

*p q* show two forming-rolls, similar to *c d*, and which complete the operation, hereafter described, of folding and pressing the edge of the paper. These are placed, one above another, like *c d*, and receive motion by the gear *l* matching the gear *r*, and also *r* matching *s*, on the shaft of the upper roll, *p*; and, furthermore, by the gear *o*, pinion *t*, and gear *u*, on the other end of the shaft of the under forming-roller, *q*.

*v* is a winding-roll, to receive the goods when the process is complete, and is revolved, automatically, with the machine, by the truck *w*, band *x*, and truck *y*.

*z* shows a guide-rack, fig. 4, placed over the paste-roll *j*, and under the press-roll *m*.

This guide-rack *z* has apertures, 5 6, and tapering throats, and convex bottoms, and curved sides, the apertures being on the side of the rack next the rollers *c d*, and the tapering throats 7 8 toward the two forming-rolls *p q*.

Up in the centre of apertures 5 6 project, for a certain distance, the trucks 1, 2, 3, 4, of the paste-roll *j*, so as to meet the periphery of the press-roll *m*.

*a'* shows a shaft, under the two rolls *c d*, which has free spools thereon, to contain the cord or other material which is laid in the fold of the edge of the paper.

The operation of the invention is as follows:

Sufficient quantity of paste or other adhesive or mucilaginous substance is placed in the trough *k*. Cord is wound on to the proper spool or spools on the shaft *a'*, and the paper to be corded is wound or placed upon the roller *a*. The power is applied at, and motion imparted to the shaft *f*, where a crank is shown in the drawings. Sufficient cord is first wound, from its spool or spools, on the shaft *a'*, to pass up, through the apertures, 5 6, of the guide-rack, over the paste-roll *j*, in minute grooves, 9, on the trucks thereof, in order to be ready for insertion into the partially-formed fold of the paper at this place. The paper is then carried, from its unwinding-roller *a*, either over or under *b*, and so directed as to pass between the rolls *c d*, when, being taken by these rolls *c d*, the edges are bent at right angles by the projections and corresponding grooves on the upper and under rolls. (The width of the folded part is controlled entirely by the height of the projections and depth of the grooves on the two rolls.) Passing between these rolls, the paper next enters the apertures, 5 6, of the guide-rack, and passes over the paste-roll *j*, where that part of the paper upon which the folded part is to rest receives its supply of adhesive substance from the trucks 1, 2, &c. The folded or turned edge of the paper laps down over the edge of these trucks, and, consequently, over the cord in the groove on the trucks, as seen in fig. 7. At this point, the paper and cord are carried, by the revolution of the paste-roll and its trucks, into the throats 7 8. These throats are made tapering, as seen at *b'*, fig. 6. The folded or bent edge of the paper, together with the cord, enters these throats, and, as it is carried up into the same, the fold of the paper gradually laps over upon that part which has received the paste, at the same time enclosing the cord, which, with the paper, has entered the throats from the paste-roll *j*. Emerging from the narrow or thin end of the throats, the paper, with its cords, passes between the rolls *p q*, whose pressure completes the process, pressing the folded edge down closely over the cord, and upon the paper, after which the finished article is wound up on roll *v*.

*p* and *q* may be made smooth, if desired, as their function is simply to press the folded paper.

Thus the paper is carried through the machine by the revolution of the rolls, and the different operations performed, as described.

The cord may be carried entirely through the machine to the winding-roll *v*, if desired, before the paper is started; but if carried no further than the trucks of the paste-roll, the paper, with its adhesive coating, would then carry the cord with it.

The formation of the edge is controlled by the construction of the projections and grooves on the rolls *c d*.

What is hereby claimed, and desired, to be secured by Letters Patent, is—

1. The paste-roll *j*, having the pasting-disks, with grooved edges, to receive the cord to be inserted into the fold of the paper, substantially as shown.

2. The method of folding, pasting, and inserting a cord into the edge of paper goods, substantially as herein shown, to wit, by the described operation of rolls *c d*, paste-roll *j*, made as set forth, roll *m*, trough *k*, guards *z*, chutes *b'*, rolls *p q*, and winding-roll *v*, constructed and arranged as herein set forth.

A. T. DENISON.
E. P. FURLONG.

Witnesses:
A. C. DENISON,
B. E. FURLONG.